United States Patent [19]

Cynar

[11] Patent Number: 5,711,511
[45] Date of Patent: Jan. 27, 1998

[54] GARDEN HOSE VALVE SPINDLE EXTENDER

[76] Inventor: R. Bruce Cynar, 10023 St. Clairs Retreat, Fort Wayne, Ind. 46825

[21] Appl. No.: 385,456

[22] Filed: Feb. 8, 1995

[51] Int. Cl.⁶ ................................................. F16K 31/60
[52] U.S. Cl. .................... 251/293; 137/360; 16/114 R; 74/511 R; 74/544
[58] Field of Search .................... 251/293, 294; 137/357, 360; 16/114 R, 115; 74/504, 511 R, 544, 546

[56] References Cited

U.S. PATENT DOCUMENTS

| | | | |
|---|---|---|---|
| 796,111 | 8/1905 | Canfield | 74/544 X |
| 935,856 | 10/1909 | O'Meara | 251/293 X |
| 1,754,310 | 4/1930 | Ellenberger | 137/360 X |
| 3,596,875 | 8/1971 | Couper | 251/294 |
| 3,598,361 | 8/1971 | Crowe | 251/293 X |
| 4,266,320 | 5/1981 | Grant | 251/293 X |

FOREIGN PATENT DOCUMENTS

| | | | |
|---|---|---|---|
| 2220732 | 10/1974 | France | 251/293 |
| 1321773 | 6/1973 | United Kingdom | 251/293 |

*Primary Examiner*—John Rivell

[57] ABSTRACT

A garden hose valve spindle extender comprised of an elongated rod. A knob is secured to a first end of the elongated rod. The device contains an attachment plate having a fitting extending outwardly therefrom. The attachment plate is securable to an existing water spigot. The device also contains a universal joint having an upper portion and a lower portion. The upper portion is secured to a second end of the elongated rod. The lower end is coupled to the fitting extending outwardly from the attachment plate.

3 Claims, 4 Drawing Sheets

GARDEN HOSE VALVE SPINDLE EXTENDER

BACKGROUND OF THE INVENTION

1. Field of the Invention

The present invention relates to a garden hose valve spindle extender and more particularly pertains to enabling a user to open and close a valve without having to bend down with a garden hose valve spindle extender.

2. Description of the Prior Art

The use of faucet extenders is known in the prior art. More specifically, faucet extenders heretofore devised and utilized for the purpose of providing access to a faucet away from a house are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,299,597 to Fort et al. discloses a valve operating handle.

U.S. Pat. No. 5,093,959 to McTargett et al. discloses a faucet handle assembly.

U.S. Pat. No. 4,445,527 to Leimbach discloses a valve extension.

U.S. Pat. No. 4,266,320 to Grant discloses a faucet extender.

U.S. Pat. No. Des. 243,488 to Linse discloses the ornamental design for a combination faucet extender and garden hose rack.

U.S. Pat. No. 3,656,793 to Mathews discloses an extension for bath faucet valve operators.

While these devices fulfill their respective, particular objective and requirements, the aforementioned patents do not describe a garden hose valve spindle extender for enabling a user to open and close a valve without having to bend down.

In this respect, the garden hose valve spindle extender according to the present invention substantially departs from the conventional concepts and designs of the prior art, and in doing so provides an apparatus primarily developed for the purpose of enabling a user to open and close a valve without having to bend down.

Therefore, it can be appreciated that there exists a continuing need for new and improved garden hose valve spindle extender which can be used for enabling a user to open and close a valve without having to bend down. In this regard, the present invention substantially fulfills this need.

SUMMARY OF THE INVENTION

In the view of the foregoing disadvantages inherent in the known types of faucet extenders now present in the prior art, the present invention provides an improved garden hose valve spindle extender. As such, the general purpose of the present invention, which will be described subsequently in greater detail, is to provide a new and improved garden hose valve spindle extender and method which has all the advantages of the prior art and none of the disadvantages.

To attain this, the present invention essentially comprises an elongated rod having a first end, a second end, and an intermediate extent therebetween. The first end has a threaded aperture formed therein. The device contains a circular knob having a centrally disposed aperture formed therethrough. The circular knob is secured to the first end of the elongated rod by a threaded nut and washer through the threaded aperture of the first end. The device contains an attachment plate having a pair of apertures formed therethrough. The attachment plate has a fitting extending outwardly therefrom. The attachment plate is securable to an existing water spigot by a pair of nuts and bolts through the pair of apertures of the attachment plate. The device contains a universal joint having an upper portion and a lower portion. The upper portion is secured to the second end of the elongated rod. The lower end is coupled to the fitting extending outwardly from the attachment plate. A securement hook is secured to a house upwardly from the existing water spigot. The securement hook is adapted to secure to the intermediate extent of the elongated rod to support the rod when not in use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved garden hose valve spindle extender which has all the advantages of the prior art faucet extenders and none of the disadvantages.

It is another object of the present invention to provide a new and improved garden hose valve spindle extender which may be easily and efficiently manufactured and marketed.

It is a further object of the present invention to provide a new and improved garden hose valve spindle extender which is of durable and reliable construction.

An even further object of the present invention is to provide a new and improved garden hose valve spindle extender which is susceptible of a low cost of manufacture with regard to both materials and labor, and which accordingly is then susceptible of low prices of sale to the consuming public, thereby making such a garden hose valve spindle extender economically available to the buying public.

Still yet another object of the present invention is to provide a new and improved garden hose valve spindle extender which provides in the apparatuses and methods of the prior art some of the advantages thereof, while simultaneously overcoming some of the disadvantages normally associated therewith.

Even still another object of the present invention is to provide a new and improved garden hose valve spindle extender for enabling a user to open and close a valve without having to bend down.

Lastly, it is an object of the present invention to provide a new and improved garden hose valve spindle extender comprised of an elongated rod. A knob is secured to a first end of the elongated rod. The device contains an attachment plate having a fitting extending outwardly therefrom. The attachment plate is securable to an existing water spigot. The device also contains a universal joint having an upper portion and a lower portion. The upper portion is secured to a second end of the elongated rod. The lower end is coupled to the fitting extending outwardly from the attachment plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
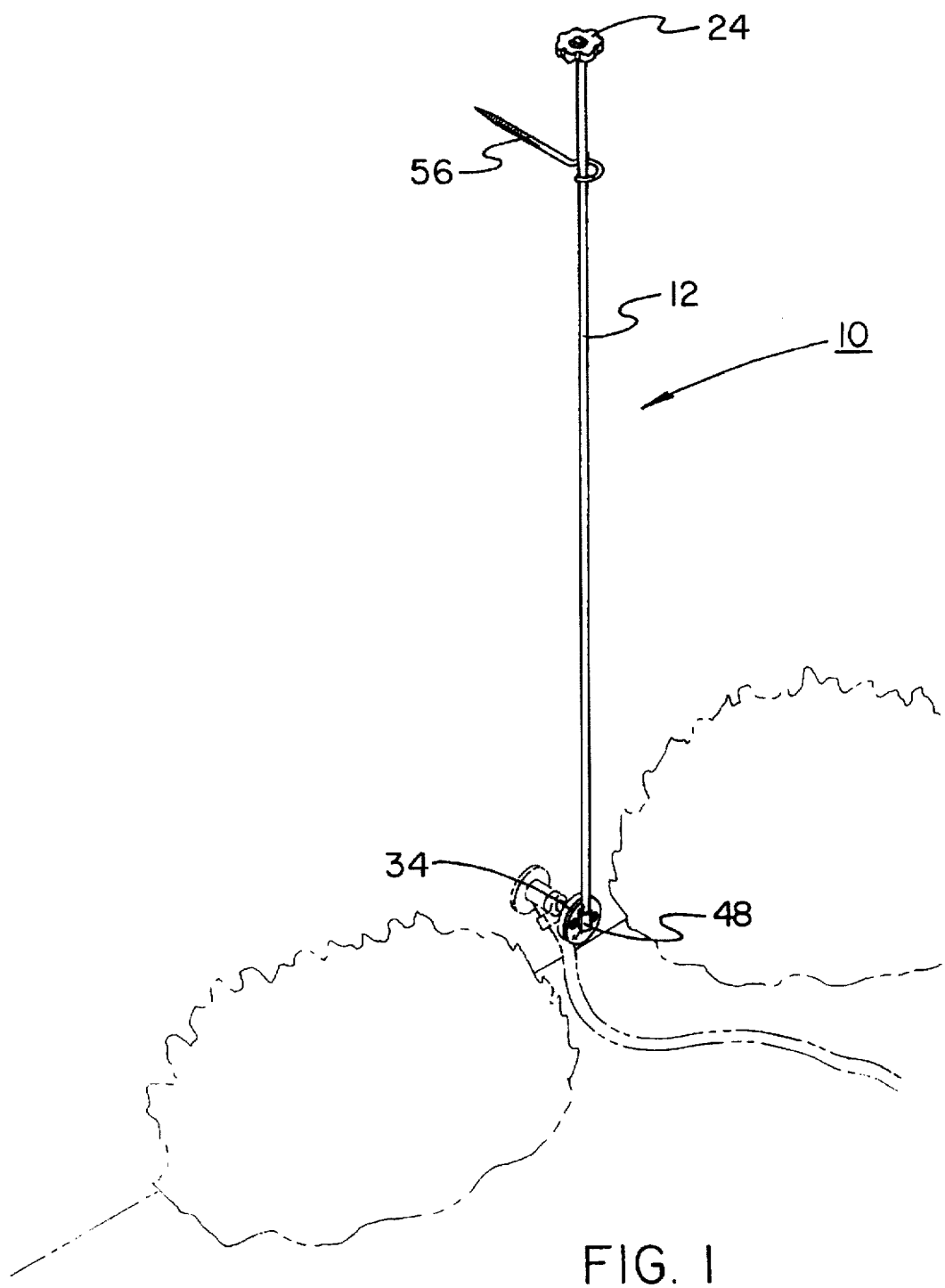
FIG. 1 is a perspective view of the preferred embodiment of the garden hose valve spindle extender constructed in accordance with the principles of the present invention.
Figure 2:
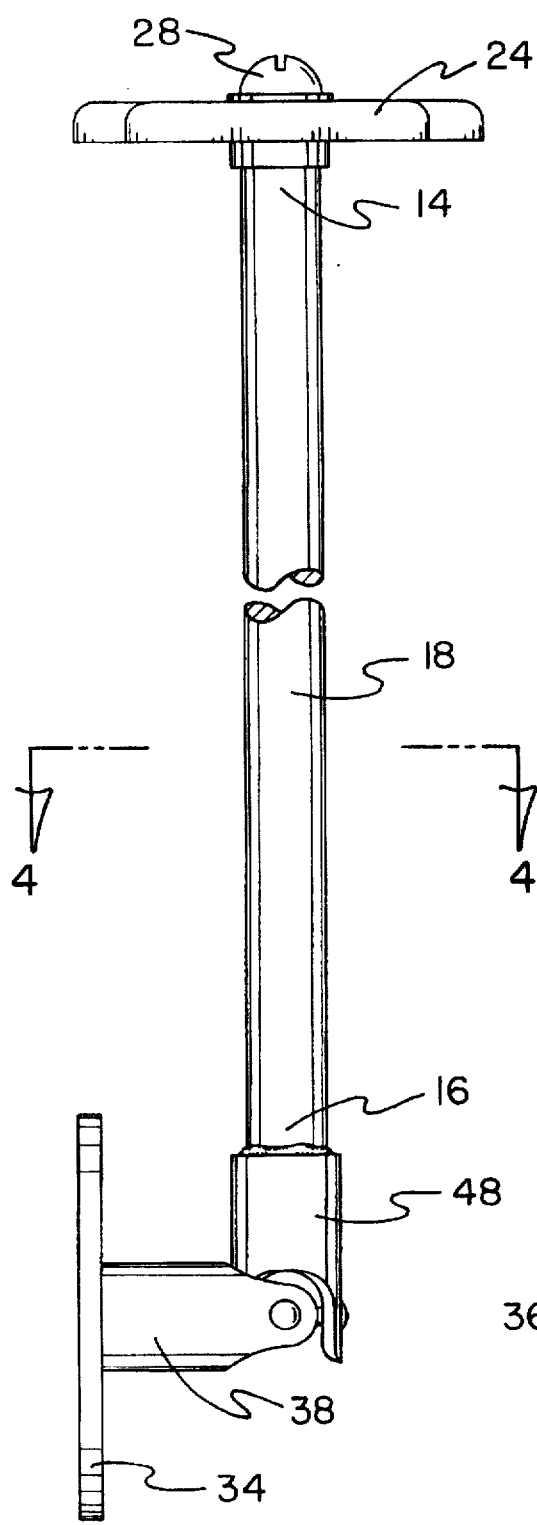
FIG. 2 is a side elevation view of the present invention.
Figure 3:
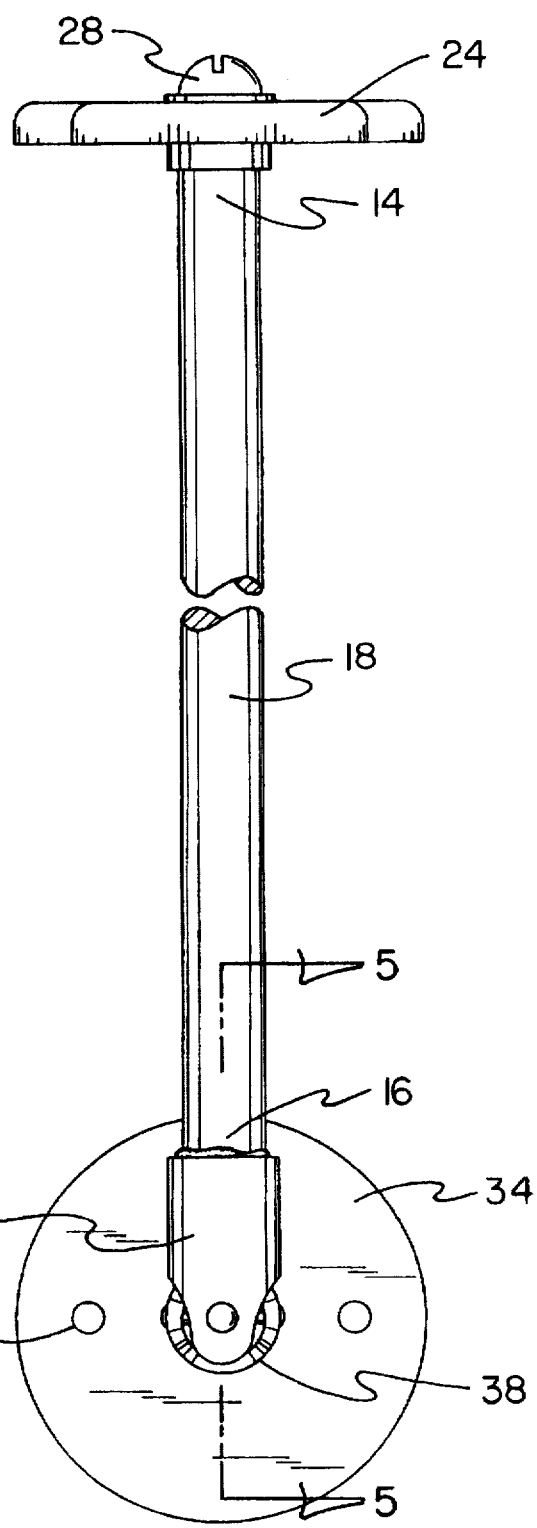
FIG. 3 is a side elevation view of the present invention.
Figure 4:
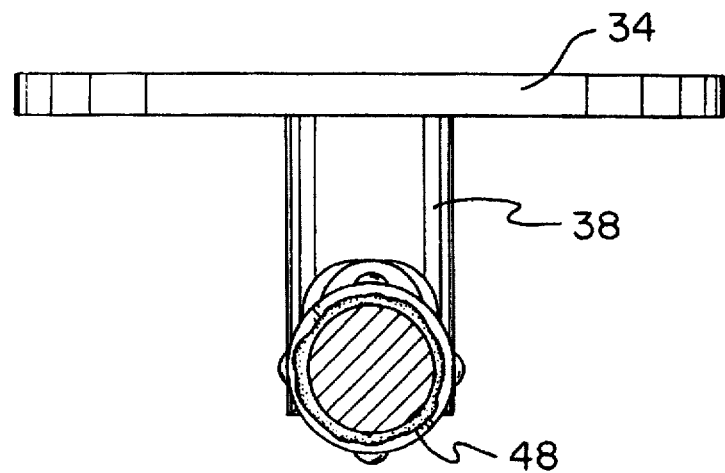
FIG. 4 is a cross-sectional view as taken along line 4—4 of FIG. 2.
Figure 5:
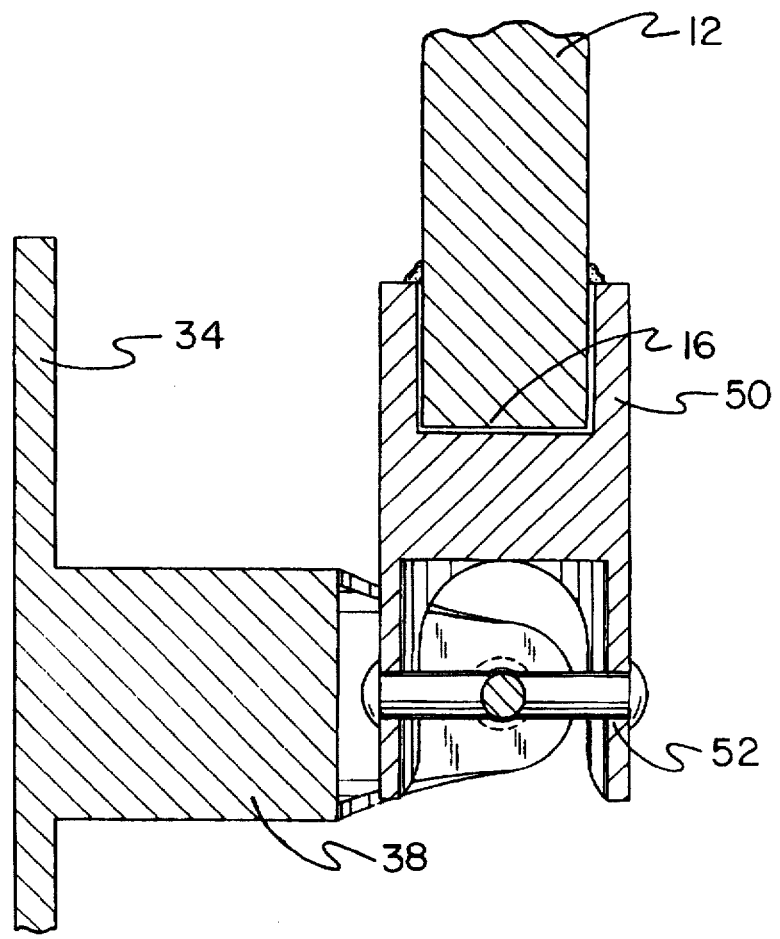
FIG. 5 is a cross-sectional view as taken along line 5—5 of FIG. 3.
Figure 6:
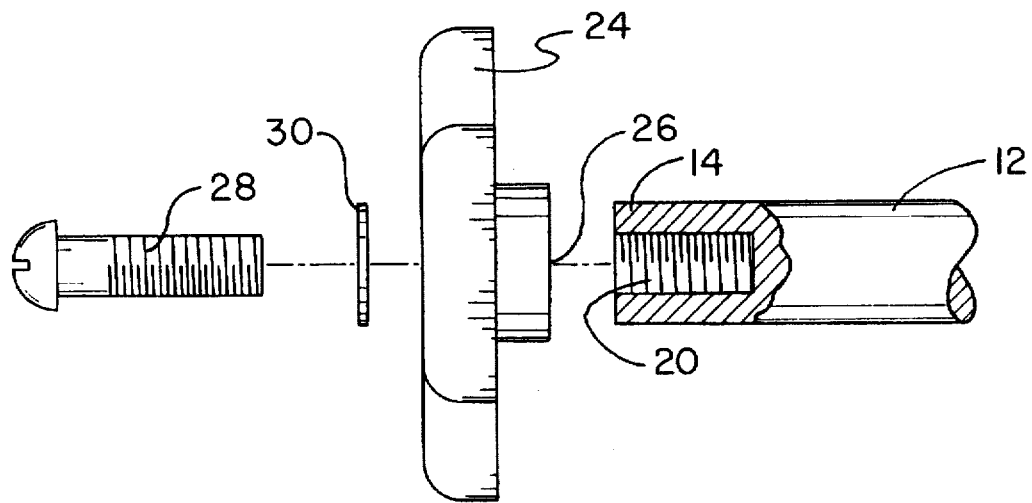
FIG. 6 is an exploded side view of the knob of the present invention.
Figure 7:
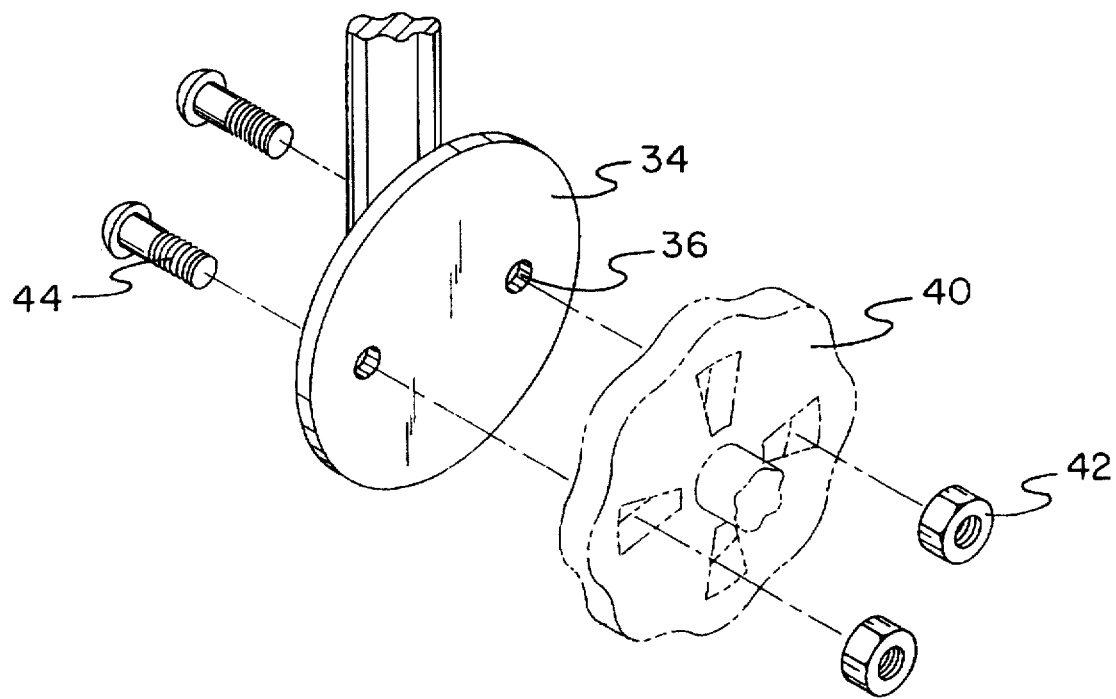
FIG. 7 is an exploded perspective view of the attachment plate of the present invention.

With reference now to the drawings, and in particular, to FIG. 1 thereof, the preferred embodiment of the new and improved garden hose valve spindle extender embodying the principles and concepts of the present invention and generally designated by the reference number 10 will be described.

Specifically, it will be noted in the various Figures that the device relates to a new and improved garden hose valve spindle extender for enabling a user to open and close a valve without having to bend down. In its broadest context, the device consists of an elongated rod, a circular knob, an attachment plate, a universal joint, and a securement hook.

The device 10 contains an elongated rod 12 having a first end 14, a second end 16, and an intermediate extent 18 therebetween. The first end 14 has a threaded aperture 20 formed therein.

The device 10 contains a circular knob 24 having a centrally disposed aperture 26 formed therethrough. The circular knob 24 is secured to the first end 14 of the elongated rod 12 by a threaded nut 28 and washer 30 through the threaded aperture 20 of the first end 14.

The device 10 contains an attachment plate 34 having a pair of apertures 36 formed therethrough. The attachment plate 34 has a fitting 38 extending outwardly therefrom. The attachment plate 34 is securable to an existing water spigot 40 by a pair of nuts 42 and bolts 44 through the pair of apertures 36 of the attachment plate 34.

The device 10 contains a universal joint 48 having an upper portion 50 and a lower portion 52. The upper portion 50 is secured to the second end 16 of the elongated rod 12. The lower portion 52 is coupled to the fitting 38 extending outwardly from the attachment plate 34.

A securement hook 56 is secured to a house upwardly from the existing water spigot 40. The securement hook 56 is adapted to secure to the intermediate extent 18 of the elongated rod 12 to support the rod 12 when not in use. The securement hook 56 can be secured to the house by a long spike or simply with a securement plate with screws.

The present invention is an outdoor water spigot attachment that enables the homeowner to open and close the valve without having to bend down, and without having to walk through heavy bushes.

It consists of a long metal rod 12, a handle or knob 24, a universal joint 48, and an attachment plate 34. The rod 12 is sized to suit the application, but should be made long enough so that bending is not required to use it. The handle is simply a knob 24 similar to the type found on the spigot. It is attached to the free end of the rod 12. The universal joint 48 is attached to the opposite end of the rod 12 and enables the spigot valve 40 to be opened from almost any angle. When not in use, the entire handle is stored against the home in a small clip or hook. The attachment plate 34 is fastened to the existing spigot knob using ordinary hardware. It has a small fitting 38 to accommodate the universal joint 48.

To use it, it is first installed by attaching the plate 34 to the valve. Then the universal joint 48 is inserted. To complete the installation, a small hook 56 can be placed in the vicinity to support the rod 12 when it is not being used. Operating the valve is as easy as reaching for the rod 12 and turning the knob 24. The torque is transmitted by the rod 12 to the spigot 40. It is that simple.

It helps to alleviate the bother of bending down to operate an outdoor water spigot. This is especially helpful if the spigot is located in area well covered by trees or large bushes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A garden hose valve spindle extender for enabling a user to open and close a valve without having to bend down comprising, in combination:

an elongated rod having a first end, a second end, and an intermediate extent therebetween, the first end having a threaded aperture formed therein;

a circular knob having a centrally disposed aperture formed therethrough, the circular knob secured to the first end of the elongated rod by a threaded nut and washer through the threaded aperture of the first end;

an attachment plate having a pair of apertures formed therethrough, the attachment plate having a fitting extending outwardly therefrom, the attachment plate securable to an existing water spigot by a pair of nuts and bolts through the pair of apertures of the attachment plate;

a universal joint having an upper portion and a lower portion, the upper portion secured to the second end of the elongated rod, the lower portion being coupled to the fitting extending outwardly from the attachment plate;

a securement hook secured to a house upwardly from the existing water spigot, the securement hook being adapted to secure to the intermediate extent of the elongated rod to support the rod when not in use.

2. A garden hose valve spindle extender for enabling a user to open and close a valve without having to bend down comprising, in combination:

an elongated rod;

a knob secured to a first end of the elongated rod;

an attachment plate having a fitting extending outwardly therefrom, the attachment plate securable to an existing water spigot;

a universal joint having an upper portion and a lower portion, the upper portion secured to a second end of the elongated rod, the lower portion being coupled to the fitting extending outwardly from the attachment plate;

a securement hook secured to a house upwardly from the existing Water spigot, the securement hook being adapted to be secured to the elongated rod for supporting the rod when not in use.

3. The extender as described in claim 1 and further including wherein the elongated rod, the circular knob, the attachment plate, and the universal joint are fabricated of a non-rust metal material.

* * * * *